United States Patent
Barbee et al.

(10) Patent No.: US 8,059,568 B1
(45) Date of Patent: Nov. 15, 2011

(54) ALTERNATIVE TIMING SOURCE FOR LOW-COST-INTERNET-BASE-STATION-(LCIB) SYSTEMS

(75) Inventors: Bryan T. Barbee, Olathe, KS (US); Ryan S. Talley, Overland Park, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 865 days.

(21) Appl. No.: 11/951,140

(22) Filed: Dec. 5, 2007

(51) Int. Cl.
*H04L 7/00* (2006.01)
*H04L 12/66* (2006.01)
(52) U.S. Cl. ........................ 370/304; 370/355
(58) Field of Classification Search ................. 370/304, 370/355
See application file for complete search history.

(56) References Cited

U.S. PATENT DOCUMENTS

| | | | |
|---|---|---|---|
| 7,190,703 B1 * | 3/2007 | Heitmann | 370/508 |
| 2002/0016170 A1 * | 2/2002 | Sabat et al. | 455/436 |
| 2002/0159416 A1 * | 10/2002 | Kazmi et al. | 370/335 |
| 2004/0204097 A1 | 10/2004 | Scheinert et al. | |
| 2010/0091760 A1 * | 4/2010 | Yoon | 370/350 |

* cited by examiner

*Primary Examiner* — Benjamin R Bruckart (57) ABSTRACT

Methods and systems are provided for implementing an alternative timing source for low-cost-Internet-base-station-(LCIB) systems. In accordance with an embodiment, an LCIB has an internal clock. The LCIB is arranged to receive a GPS signal, and to treat timing information embedded in the GPS signal as the LCIB's primary source of timing information for calibrating the internal clock. The LCIB detects a loss of the GPS signal, and responsively uses a macro-network receiver to receive macro-network timing information from a macro network, which is a terrestrial wireless network. The LCIB uses the macro-network timing information to calibrate the internal clock.

16 Claims, 4 Drawing Sheets

ALTERNATIVE TIMING SOURCE FOR LOW-COST-INTERNET-BASE-STATION-(LCIB) SYSTEMS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors.

When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for implementing an alternative timing source for LCIB systems. In one aspect, an exemplary embodiment may take the form of a method, in accordance with which an LCIB having an internal clock is provided. The LCIB is arranged to receive a GPS signal, and to treat timing information embedded in the GPS signal as the LCIB's primary source of timing information for calibrating the internal clock. The LCIB detects a loss of the GPS signal, and responsively uses a macro-network receiver to receive macro-network timing information from a macro network, which is a terrestrial wireless network. The LCIB uses the macro-network timing information for calibrating the internal clock.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As noted above, LCIBs typically have an internal or external GPS receiver that provides precise timing information for the LCIB by decoding timing information embedded in GPS signals. LCIBs typically use this timing information to synchronize their operations with those of the macro network. Among other reasons, this synchronization is important for LCIB functions that involve both the LCIB and the macro network, such as when mobile stations are handed off from the macro network to the LCIB. However, LCIBs are often deployed indoors, perhaps in locations such as closets or basements, where it may be difficult to receive GPS signals. Thus, LCIBs deployed in these types of locations—and in other locations as well—may experience intermittent or extended loss of GPS signals, leading in turn to a loss of synchronized timing with the macro network. This can cause degraded performance with respect to hybrid LCIB-and-macro-network operations such as handoffs, along with other problems.

In accordance with the invention, an LCIB is arranged to be able to receive and decode timing information from the macro network, and to use that macro-network timing information to calibrate its own internal clock. In an embodiment, an LCIB may determine that it is not receiving a GPS signal for a threshold amount of time, and responsively use timing information received from the macro network to verify its timing, and to correct it if necessary. In that way, the LCIB can remain synchronized with the macro network during times of loss of GPS signal. The present solution has at least one advantage over one existing solution to the loss-of-GPS-timing-data problem—that being to use a high-reliability oscillator to provide timing: the present solution is less expensive. The present solution also has at least two advantages over a second existing solution—that being to receive timing information over the user's Internet connection: the present solution does not use valuable backhaul bandwidth, and is more accurate.

In accordance with one embodiment of the present invention, the macro network is a CDMA network, and the LCIB uses a CDMA receiver to acquire the CDMA sync channel and decode the "System Time" and "State of the Long Code" parameters. The LCIB then uses these values to derive the macro-network timing, as is known in the art of CDMA technology. The LCIB will then check its internal clock against the macro-network time, and update its timing if there is a discrepancy that exceeds a threshold tolerance. The LCIB may then periodically monitor the sync channel to make periodic updates to the LCIB's timing. In general, the LCIB may acquire the sync channel on a continuous (i.e. frequent and periodic) basis, or on as as-needed basis (e.g. in response to the LCIB losing its GPS signal).

In typical CDMA networks, the sync-channel message repeats every 26.66 milliseconds (ms); thus, the LCIB could use the sync channel for timing purposes that often if desired. And other time intervals could be used as well. Typically, LCIBs update their internal clocks on the order of once per second using GPS information (when available). In one embodiment, LCIBs may, in times of GPS-signal loss, use macro-network timing information to update their internal clocks just as often. Regardless of how often the LCIB uses the macro-network timing to update its internal clock, the LCIB may also periodically attempt to reacquire a GPS signal.

It should be noted that a CDMA macro network is used by way of example. In a given implementation, the macro network could operate according to EV-DO, GSM, TDMA, and/or any other technology. And, as noted above, LCIBs typically transmit a pilot beacon that includes administrative messages and parameters that mobile stations can use to facilitate handoffs from the macro network to the LCIB. In accordance with the invention, the LCIB may update any overhead messages that it transmits to reflect its current (i.e. updated) clock settings.

2. Exemplary Architecture a. An Exemplary Communication System

Figure 1:
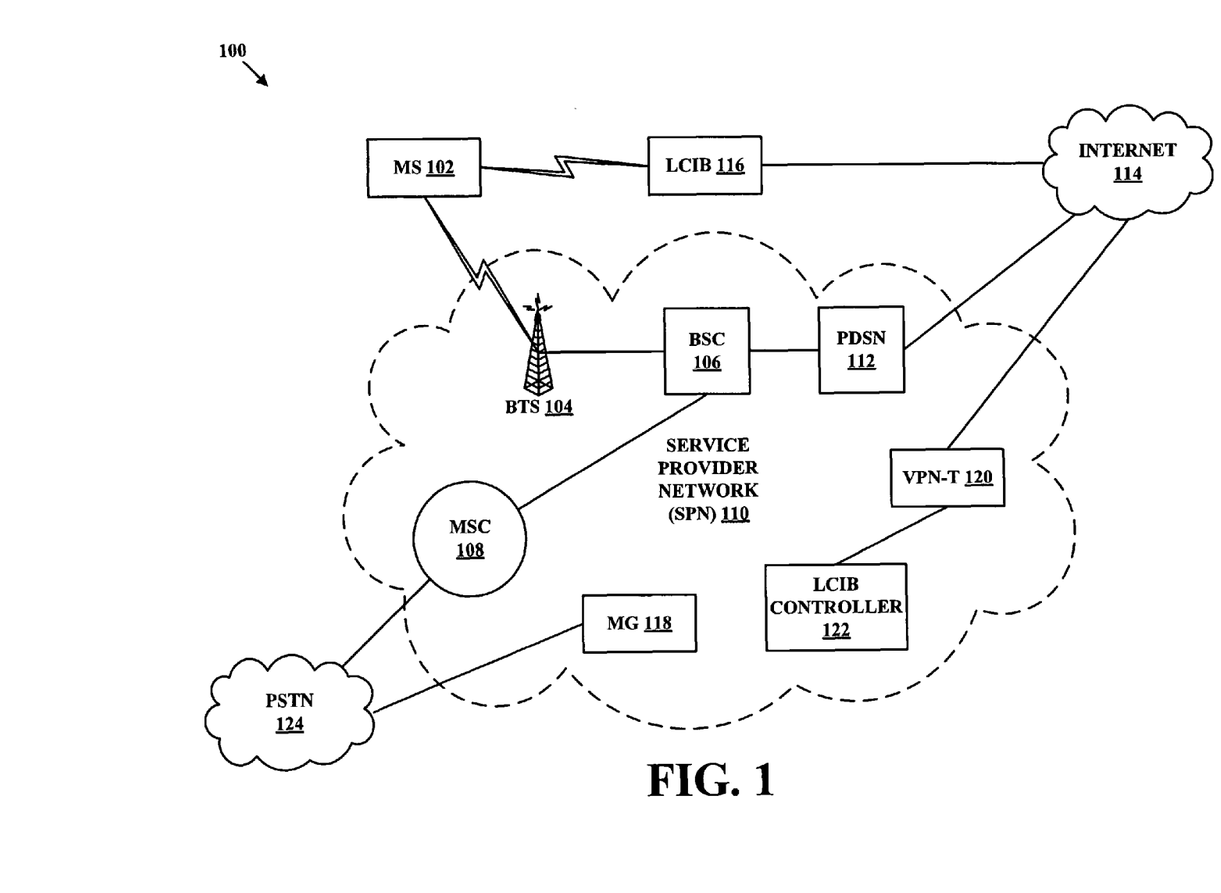
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, and a public switched telephone network (PSTN) 124. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
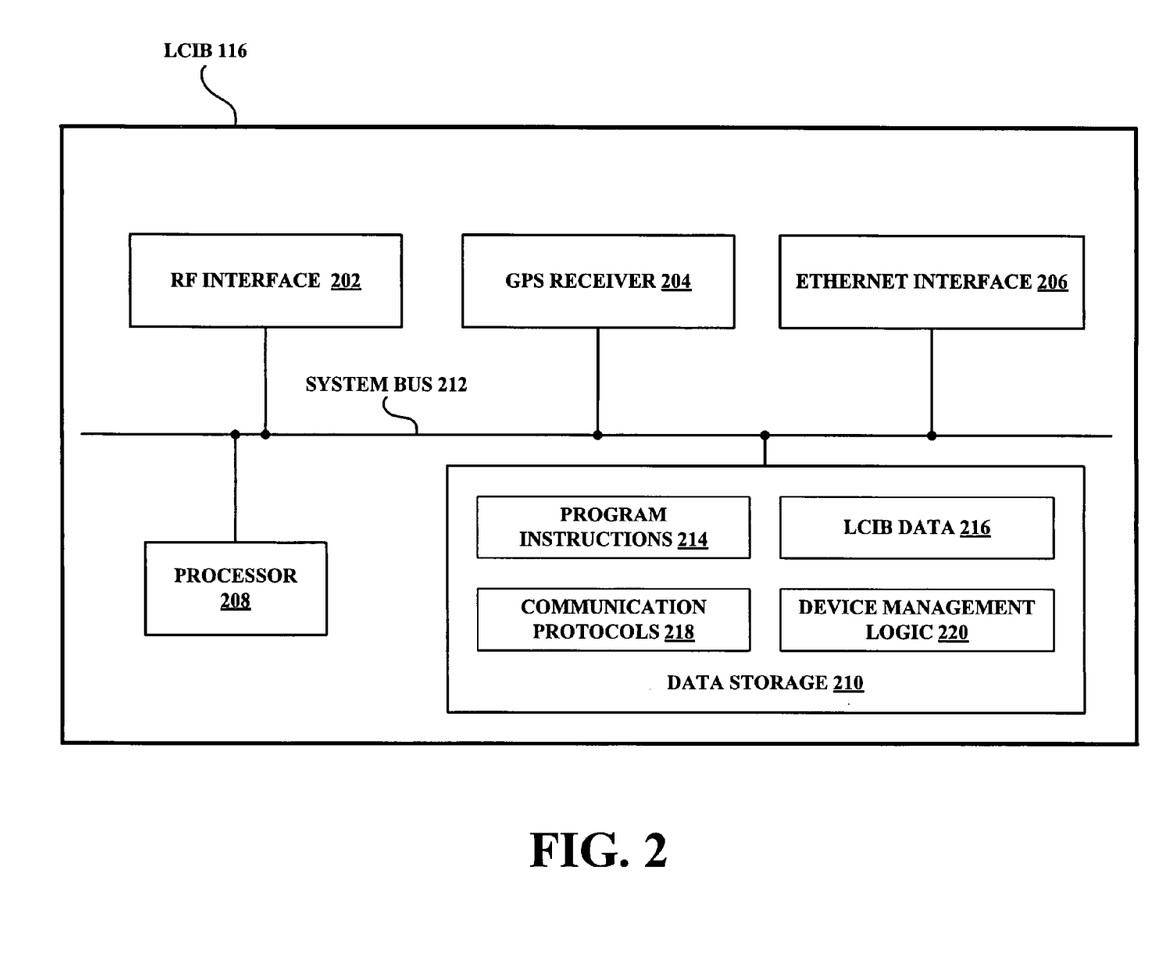
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). In accordance with the invention, RF interface 202 may include a CDMA receiver for receiving and decoding macro-network timing information. GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. Note that LCIB 116 also includes an internal clock that it may use for its own timing, and for synchronization with one or more macro-networks, including conducting handoffs and expressing timing data in overhead messages such as pilot-beacon messages. This clock may be a component of processor 208, or may be a standalone component, and may be implemented as any combination of software, hardware, and/or firmware.

The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
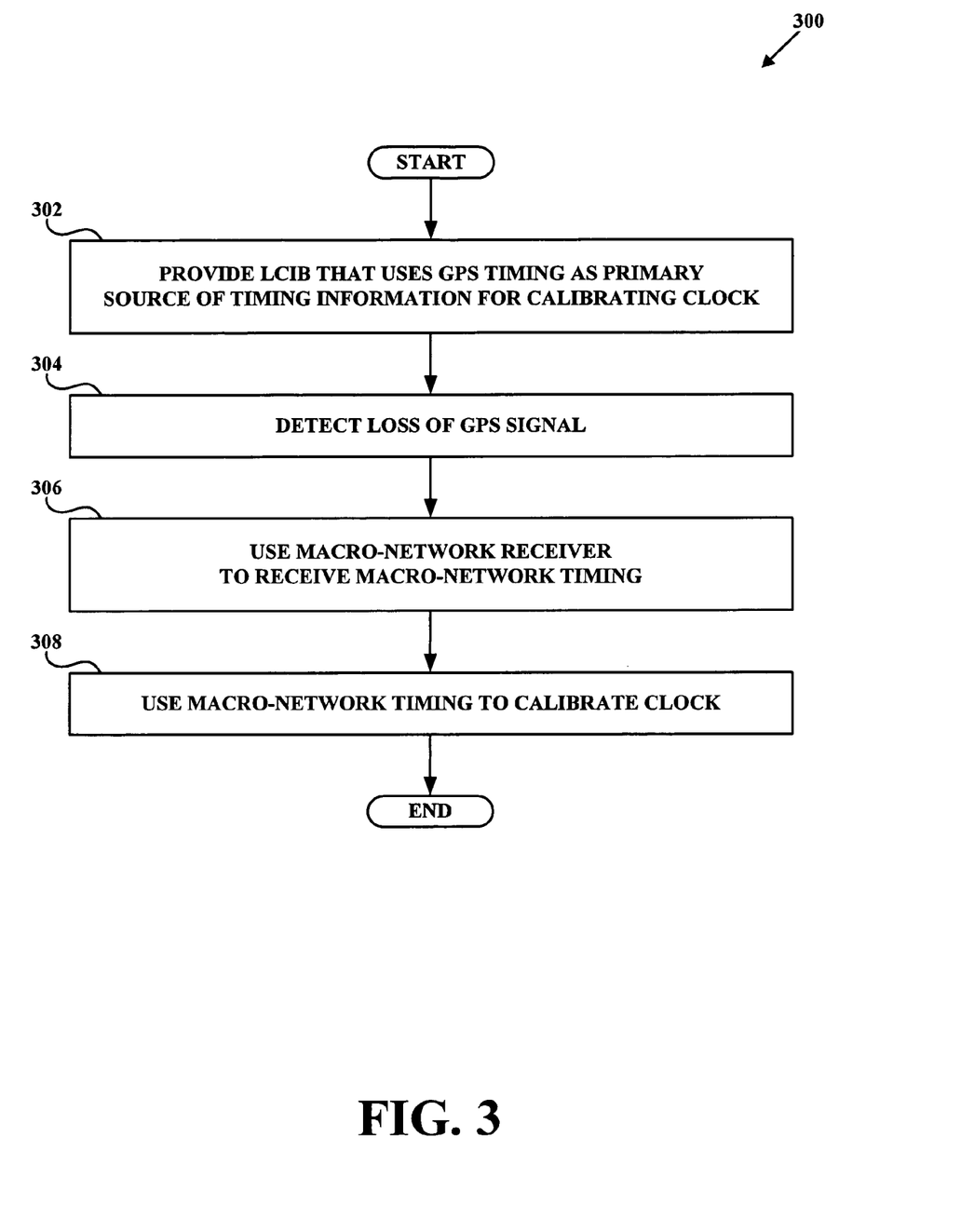
FIG. 3 is a flowchart of a method, in accordance with exemplary embodiments.

FIG. 3 depicts a flowchart of an exemplary method, in accordance with an exemplary embodiment. In particular, FIG. 3 depicts a method 300, which begins at step 302, when an LCIB, such as LCIB 116, having an internal clock is provided, where LCIB 116 is arranged to receive a GPS signal, and where LCIB 116 is arranged to treat timing information embedded in the GPS signal as LCIB 116's primary source of timing information for calibrating the internal clock. At step 304, LCIB 116 detects a loss of the GPS signal. At step 306, responsive to detecting the loss of the GPS signal, LCIB 116 uses a macro-network receiver to receive macro-network timing information from a macro network, where the macro network is a terrestrial wireless network. At step 308, LCIB 116 uses the macro-network timing information for calibrating the internal clock. These steps are further explained in the following subsections.

And it should be noted that, although method 300 is described as being carried out by LCIB 116, this is not required. In some embodiments, method 300 may be carried out by LCIB 116 in cooperation with one or more other network entities, such as VPN terminator 120 and LCIB controller 122. In general, method 300 could be carried out by any one or any combination of the network elements described herein, or any other network element(s).

i. Provide LCIB that Uses GPS Timing as Primary Information Source for Calibrating Clock At step 302, LCIB 116 is provided. According to the present invention, LCIB 116 has an internal clock, which may be implemented in hardware, software, and/or firmware, without departing from the scope and spirit of the present invention. In general, perhaps among other uses, LCIB 116 uses its internal clock to remain synchronized with a macro network. For example, LCIB 116 may use its internal clock to stay synchronized with a CDMA network of which BTS 104 is a part. And note that the term "internal" is not meant to limit the clock to being contained within any particular structure.

In accordance with the present invention, LCIB 116 is arranged to receive a GPS signal. As such, as described above, LCIB 116 may have an internal or external GPS receiver, which LCIB 116 may use to receive the GPS signal. Note that this GPS signal could be one signal from one satellite, but may just as well be a combination of multiple signals from multiple satellites. Furthermore, LCIB 116 is programmed to decode the received GPS signal, and to extract timing information embedded therein, and use that GPS-timing information to calibrate the internal clock. Calibrating may involve overwriting an existing clock value with a received value on a regular or non-regular basis, and/or simply confirming that a current clock value is close enough to a GPS-signal timing value. And other possibilities exist as well.

Thus, as a default, LCIB 116 treats the timing information in the GPS signal it receives as its primary guide for setting, updating, and generally calibrating its internal clock. Note as well that nearby macro base stations such as BTS 104 may be receiving GPS signals as well, and similarly using timing information therein to calibrate their clocks. As such, LCIB 116 doing the same or a similar thing with the GPS-timing information is effectively an effort to remain synchronized with the macro (e.g. CDMA) network.

ii. LCIB Detects Loss of GPS Signal

At step 304, LCIB 116 detects a loss of the GPS signal that it was receiving. Note that this loss of GPS signal could be for any reason—including a malfunction or service disruption involving one or more GPS satellites, some type of weather-related or other interference, and/or any other reason—without departing from the scope and spirit of the present invention. In one embodiment, step 304 involves detecting the loss of the GPS signal for a timeout period, which may be set to any value suitable for a given implementation.

iii. LCIB Acquires Macro-Network Timing

At step 306, responsive to detecting the loss of the GPS signal in step 304, LCIB 116 uses a macro-network receiver to receive macro-network timing information from a macro network, where the macro network is a terrestrial wireless network. For example, LCIB 116 may use its CDMA receiver, described above as being part of RF interface 202, to acquire the CDMA sync channel broadcast by BTS 104. Inherent in that sync channel are one or more values from which LCIB 116 can derive the timing of the surrounding CDMA macro network. In particular, LCIB 116 may decode the sync channel to identify two values known as "System Time" and "State of the Long Code". As is known in the art, from these two values, LCIB 116 can derive the current timing of the CDMA macro network.

And it should be noted that a CDMA macro network is offered by way of example and not by way of limitation. That is, the macro network could operate using CDMA, EV-DO, GSM, TDMA, some other technology or technologies, as well as any combination of the foregoing. With different technologies may come different channels, messages, parameters, etc. to decode and possibly use as inputs to one or more calculations, in order to identify and/or derive the current macro-network timing value(s).

iv. LCIB Uses Macro-Network Timing to Calibrate Clock

At step 308, LCIB 116 uses the macro-network timing information identified in step 306 for calibrating its internal clock. As stated above, this step and/or step 306 may involve using received macro-network timing information to calculate a current macro-network time. LCIB 116 may then set its internal clock based on that current macro-network time. In another embodiment, LCIB 116 may check how close that current macro-network time is to its own time that it is currently maintaining. That is, LCIB 116 may calculate a difference between the current macro-network time and its current LCIB-116 time. LCIB 116 may then compare this difference to a threshold value that it maintains for at least this purpose. If the calculated difference is greater than the threshold difference, LCIB 116 may set its internal clock based on the current macro-network time. If, however, the difference is not greater than the threshold difference, LCIB 116 may set its internal clock based on the current LCIB time, which may involve simply leaving its current clock value as is.

v. Periodic Clock Updates, Periodic Attempts to Reacquire GPS, Updates to LCIB Overhead Messages Furthermore, it is contemplated that some or all of method 300, as described above and generally herein, may be carried out periodically, so as to endeavor to keep LCIB 116's operations synchronized with those of the macro network. As such, during however long the loss of GPS signal lasts, LCIB 116 may repeatedly (a) use its CDMA receiver to receive updated timing information from the CDMA network and (b) use that updated timing information to calibrate its internal clock. This may involve derivations, calculations, comparisons, etc. as described herein, or any other suitable data manipulations.

Note that LCIB 116 may be arranged to periodically acquire macro-network timing information just during times when no GPS signal is available, or at all times, or according to some other criteria. When no GPS signal is available, LCIB 116 may use CDMA timing information to calibrate its internal clock once every 26.66 milliseconds (ms) (which is how often a CDMA sync channel typically cycles), once every second (which is the period a typical LCIB may use for updating its clock using GPS data when a GPS signal is available), or according to some other period.

Note as well that, at the same frequency or at a different frequency at which LCIB 116 uses CDMA timing to update its internal clock, LCIB 116 can also periodically attempt to reacquire the GPS signal. Once it successfully does so, it may use the GPS timing information for internal timing purposes. At that point, it may cease collection of CDMA timing data, or it may continue that collection, as described above. That is, LCIB 116 may collect CDMA timing data on an all-the-time basis, on an as-needed basis, or on some other suitable basis.

Furthermore, as described, LCIB 116 may, in the course of its normal operations, transmit a pilot beacon on one or more macro-network carriers, where that pilot beacon includes various administrative messages and parameters that, as an example, mobile stations can use to conduct a handoff from the macro network to the LCIB. As part of configuring the data to be transmitted as part of the pilot beacon, LCIB 116 conveys timing data based on the current value of its internal clock. As such, when LCIB 116 uses either GPS data or CDMA data to calibrate its internal clock, it may, as a follow-up, update any necessary pilot-beacon or other overhead messages that it transmits in its coverage area to reflect the updated clock setting.

b. A Second Exemplary Method

Figure 4:
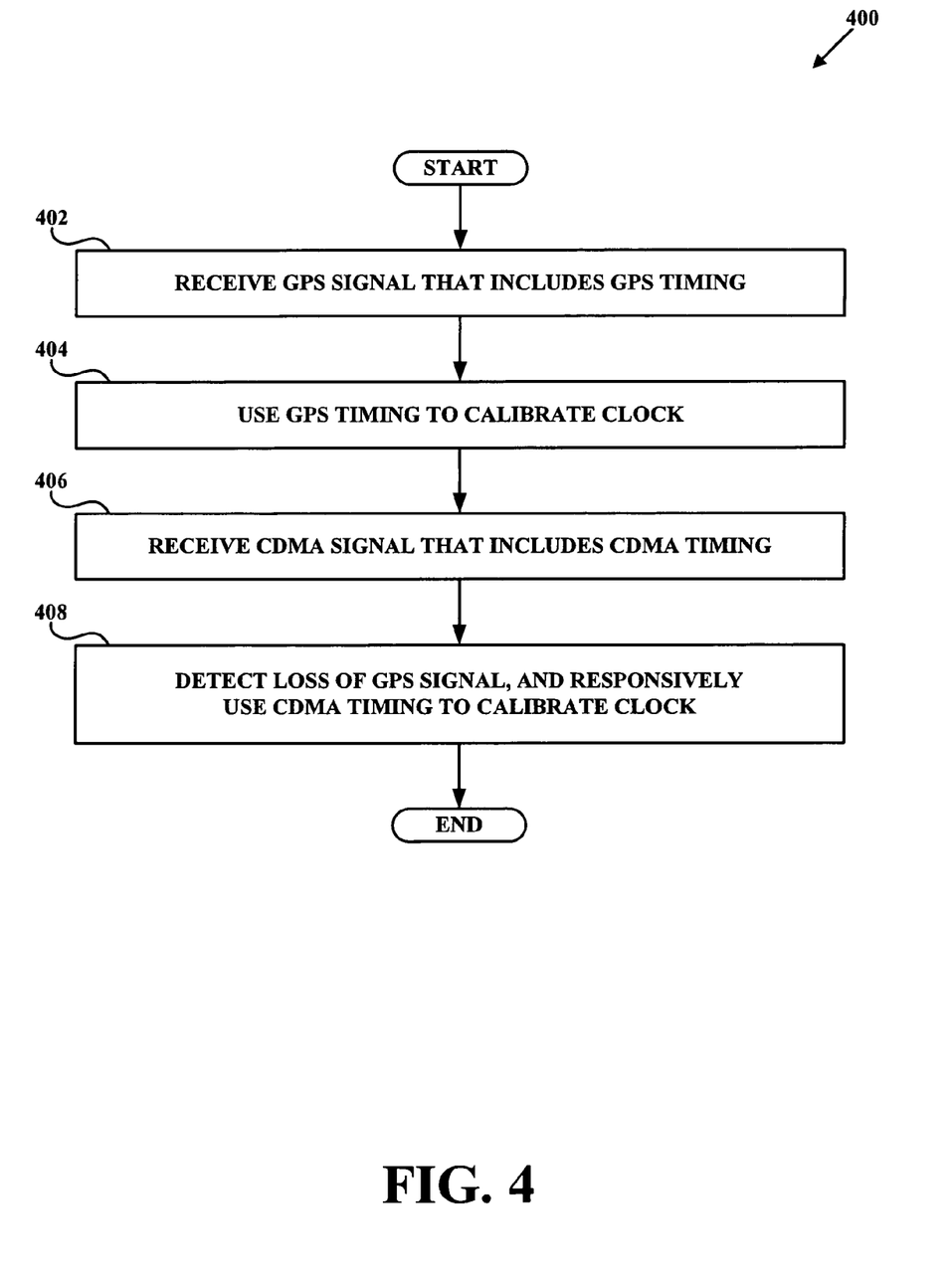
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB, such as LCIB 116, or perhaps by an LCIB in cooperation with one or more other entities, such as VPN terminator 120 and/or LCIB controller 122. Method 400 is similar in some respects to method 300, and thus is not described in as great of detail.

As shown in FIG. 4, method 400 begins at step 402, when LCIB 116 receives a GPS signal comprising GPS timing information. At step 404, LCIB 116 uses the GPS timing information to calibrate an internal clock. At step 406, LCIB 116 receives a CDMA signal comprising CDMA timing information. At step 408, LCIB 116 detects a loss of the GPS signal, and responsively uses the CDMA timing information to calibrate the internal clock.

These steps could be carried out in numerous different orders, in addition to the order listed here. For example, LCIB 116 may receive CDMA timing information before and/or after detecting a loss of GPS signal. As one option, LCIB 116 could be configured to receive CDMA timing information on a substantially continuous (i.e. periodic and frequent) basis regardless of whether LCIB 116 has a GPS signal. As another option, or LCIB 116 could be configured to seek out CDMA timing information only upon detecting a loss of GPS signal. And many other possibilities exist as well, without departing from the scope and spirit of the invention.

4. Conclusion

Various exemplary embodiments have been described above. Those skilled in the art will understand, however, that changes and modifications may be made to those examples without departing from the scope of the claims.

The invention claimed is:

1. A method carried out by a low-cost Internet base station (LCIB) having a Global Positioning System (GPS) receiver, an internal clock, and a macro-network receiver, the method comprising:
the LCIB using the GPS receiver to receive a GPS signal having timing information embedded therein, wherein the LCIB is arranged to treat the embedded timing information as the LCIB's primary source of timing information for calibrating the internal clock;
the LCIB detecting a loss of the GPS signal for a timeout period, and responsively using the macro-network receiver to receive macro-network timing information from a macro network, wherein the macro network is a terrestrial wireless network;
the LCIB using the macro-network timing information for calibrating the internal clock; and
the LCIB periodically attempting to reacquire the GPS signal.

2. The method of claim 1, wherein calibrating the internal clock comprises synchronizing with the macro network.

3. The method of claim 1, wherein the macro-network receiver comprises a code division multiple access (CDMA) receiver, the macro-network timing information comprises CDMA timing information, and the macro network comprises a CDMA macro network.

4. The method of claim 3, wherein using the macro-network receiver to receive macro-network timing information from the macro network comprises receiving and decoding a CDMA sync channel.

5. The method of claim 4, wherein the macro-network timing information comprises a system-time value and a state-of-the-long-code value.

6. The method of claim 1, wherein using the macro-network timing information for calibrating the internal clock comprises using the macro-network timing information to calculate a current macro-network time.

7. The method of claim 6, further comprising setting the internal clock based on the current macro-network time.

8. The method of claim 6, further comprising calculating a difference between the current macro-network time and a current LCIB time.

9. The method of claim 8, further comprising:
if the difference is greater than a threshold difference, setting the internal clock based on the current macro-network time.

10. The method of claim 9, further comprising:
if the difference is not greater than the threshold difference, setting the internal clock based on the current LCIB time.

11. The method of claim 1, further comprising the LCIB periodically (a) using the macro-network receiver to receive updated macro-network timing information from the macro network and (b) using the updated macro-network timing information for calibrating the internal clock.

12. The method of claim 1, wherein the macro network, the macro-network receiver, and the macro-network timing information comport with a protocol selected from the group consisting of Evolution Data Optimized (EV-DO), Global System for Mobile Communications (GSM), and time division multiple access (TDMA).

13. The method of claim 1, wherein using the macro-network timing information for calibrating the internal clock comprises setting the internal clock to an updated value, the method further comprising the LCIB updating at least one overhead message transmitted by the LCIB to reflect the updated value.

14. The method of claim 13, wherein updating at least one overhead message transmitted by the LCIB to reflect the updated value comprises updating a pilot beacon.

15. A low-cost Internet base station (LCIB) comprising:
a communication interface comprising a macro-network receiver;
a Global Positioning System (GPS) receiver;
an internal clock;
a processor; and
data storage comprising instructions executable by the processor to carry out a set of functions, the set including:
using the GPS receiver to receive a GPS signal having timing information embedded therein, wherein the LCIB is arranged to treat the embedded timing information as the LCIB's primary source of timing information for calibrating the internal clock;
detecting a loss of the GPS signal for a timeout period, and responsively using the macro-network receiver to receive macro-network timing information from a macro network, wherein the macro network is a terrestrial wireless network;
using the macro-network timing information for calibrating the internal clock; and
periodically attempting to reacquire the GPS signal.

16. A method carried out by a low-cost Internet base station (LCIB) having an internal clock, the method comprising:
the LCIB receiving a Global Positioning System (GPS) signal comprising GPS timing information;
the LCIB using the GPS timing information to calibrate the internal clock;

the LCIB receiving a code division multiple access (CDMA) signal comprising CDMA timing information;

the LCIB detecting a loss of the GPS signal for a timeout period, and responsively using the CDMA timing information to calibrate the internal clock; and the LCIB periodically attempting to reacquire the GPS signal.

* * * * *